(12) United States Patent
Feller et al.

(10) Patent No.: US 9,824,152 B1
(45) Date of Patent: Nov. 21, 2017

(54) RECIPE RECOMMENDATION

(71) Applicant: Yummly, Inc., Redwood City, CA (US)

(72) Inventors: David B. Feller, Mountain View, CA (US); Vadim Geshel, Redwood City, CA (US); Gregory Allen Druck, Jr., San Francisco, CA (US); Iurii Volodimirovich Korolov, Mountain View, CA (US); Ethan L. Smith, San Mateo, CA (US)

(73) Assignee: Yummly, Inc., Redwood City, CA (US)

( * ) Notice: Subject to any disclaimer, the term of this patent is extended or adjusted under 35 U.S.C. 154(b) by 165 days.

(21) Appl. No.: 14/292,093

(22) Filed: May 30, 2014

(51) Int. Cl.
 *G06F 17/30* (2006.01)

(52) U.S. Cl.
 CPC .................. *G06F 17/30867* (2013.01)

(58) Field of Classification Search
 CPC ............... G06F 17/30; G06F 17/30867; G06F 17/30554; G06F 17/30386; G06F 17/30528; G06F 17/30595; G06F 17/3061; G06F 17/30958
 See application file for complete search history.

(56) References Cited

U.S. PATENT DOCUMENTS

| | | | |
|---|---|---|---|
| 2007/0118498 A1* | 5/2007 | Song | G06F 17/30702 |
| 2009/0164442 A1* | 6/2009 | Shani | G06F 17/30699 |
| 2009/0313086 A1* | 12/2009 | Lee | G06Q 30/02 705/14.53 |
| 2011/0131077 A1* | 6/2011 | Tan | G06Q 30/02 705/7.29 |
| 2014/0089321 A1* | 3/2014 | Engel | G06F 17/30699 707/748 |
| 2014/0280148 A1 | 9/2014 | Stankiewicz | |
| 2016/0063106 A1* | 3/2016 | Chai | G06F 17/30958 707/722 |

\* cited by examiner

*Primary Examiner* — Amanda Willis
(74) *Attorney, Agent, or Firm* — Fenwick & West LLP

(57) ABSTRACT

User activity data describing how a user interacts with recipes posted on a web page or provided by an application is received. A first set of recommended recipes for the user is generated based on the user activity data. A content model that aligns recipe features extracted from the content of the recipes is built based on content of the recipes. A second set of recommended recipes is generated based on the content model. The first set of recommended recipes and the second set of recommended recipes are merged and transmitted for display to the user.

28 Claims, 7 Drawing Sheets

RECIPE RECOMMENDATION

BACKGROUND

Field of Disclosure

The disclosure relates generally to the field of content recommendation, and specifically to hybrid item-based/content-based recommendation of recipes.

Description of the Related Art

Many techniques are known in the art for generating recommendations for a user based on the user's profile, previous activities, expressed preferences, and other user-specific features or data. In large datasets and data rich environments, the number of generated recommendations may quickly swamp the user's ability to meaningfully engage with the recommendations, or exhaust the user's patience in sorting through them.

In the context of a website and online service devoted to recipes, quality recommendations are particularly important. One of the driving motivations for users of the service is to break away from familiar recipes and routine dishes. Thus, it is desirable to surprise and delight the user with a variety of fresh, intriguing recommendations likely to be of interest to the user.

SUMMARY

Embodiments include methods for recommending recipes. For example, user activity data describing how a user interacts with recipes is received. The recipes can be posted on a web page. Alternatively, the recipes can be made available to the user through a software application. A first set of recommended recipes for the user is generated based on the user activity data. A content model that aligns recipe features extracted from the content of the recipes is built based on content of the recipes. A second set of recommended recipes is generated based on the content model. The first set of recommended recipes and the second set of recommended recipes are merged and transmitted for display to the user.

Additional embodiments include computer-readable storage media storing computer-executable instructions for performing the steps described above. Further embodiments include systems comprising a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Embodiments of the disclosure may be described in the context of recipes posted on a web page. However, in other embodiments, the user may interact with recipes through a software application, such as a downloadable app.

System Overview

Figure 1:
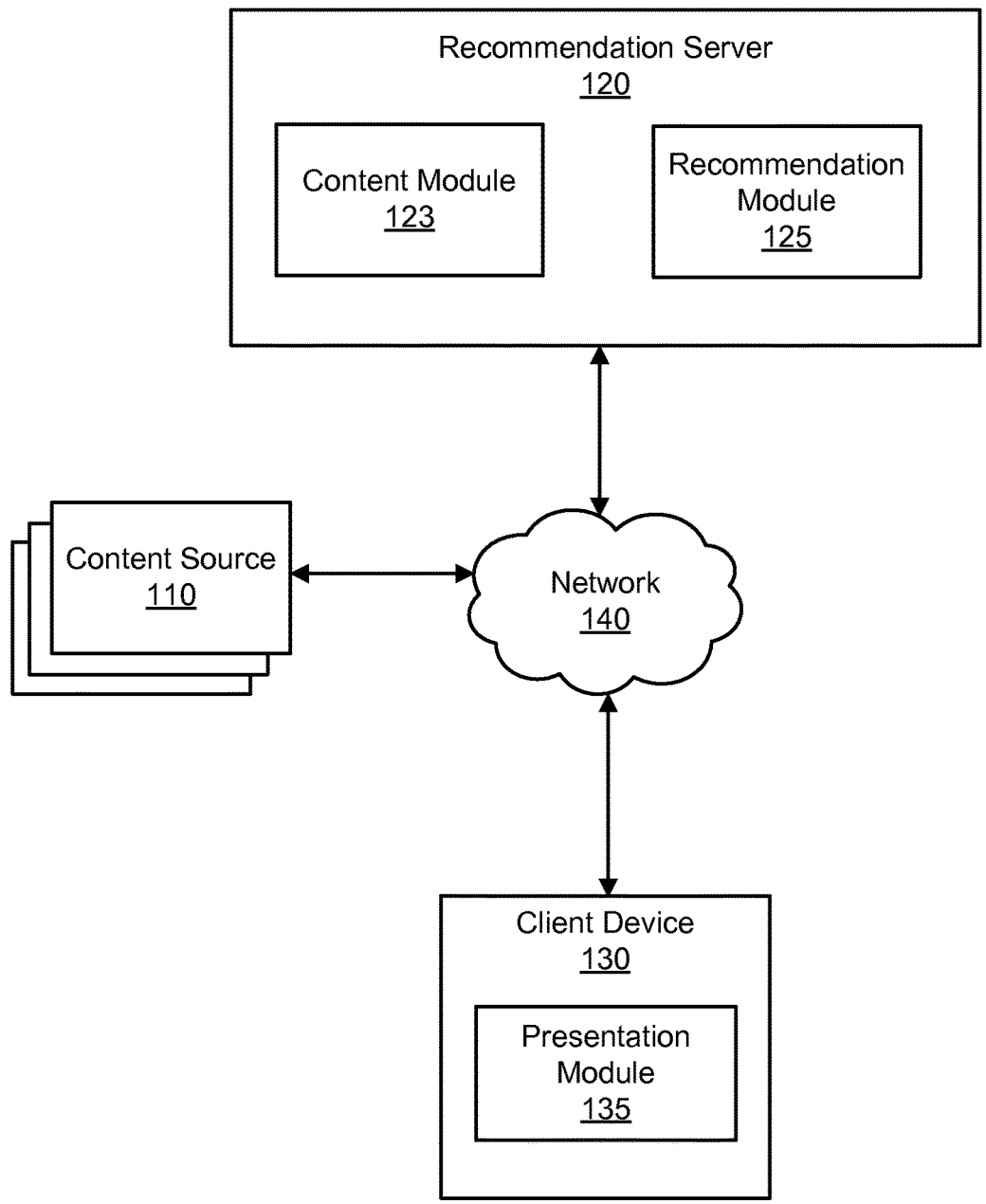
FIG. 1 is a high-level block diagram of a computing environment for supporting recommendation of recipes to users according to one embodiment.

FIG. 1 shows a computing environment 100 for supporting recommendation of recipes to users according to one embodiment. The computing environment 100 includes content sources 110, a recommendation server 120, and a client device 130 connected by a network 140. Although single instances of some of the entities are illustrated, multiple instances may be present. For example, multiple client devices 130 associated with multiple users may access recipes through the recommendation server 120. The functionalities of the entities may be distributed among multiple instances. For example, a content distribution network (or a cloud-based network) of servers at geographically dispersed locations implements the recommendation server 120 to increase server responsiveness.

The content source 110 functions as a repository of recipes accessible to the recommendation server 120. In one embodiment, the content source 110 includes one or more servers, described further with reference to FIG. 2, connected to the network 140 for providing a variety of different types of recipes to the recommendation server 120. For example, the content source 110 may be a server hosting a webpage displaying recipes through a markup language (e.g., HTML) or another structured document format. In another example, a content source 110 may implement an application programming interface (API) functionality to provide recipe access to applications native to an operating system on a client device 130.

Alternatively, a content source 110 is a repository containing recipes in a structured document format. The repository may be a non-transitory computer-readable storage medium (e.g., a hard disk drive, an optical disc, a flash memory) accessible to the recommendation server 120 through the network 140 or through a removable storage media interface.

The recommendation server 120 determines and provides recommended recipes to the client devices 130 via the network 140 for display to the users. In one embodiment, the recommendation server 120 includes a content module 123 and a recommendation module 125. Other embodiments of the recommendation server 120 include different and/or additional modules. In addition, the functions may be distributed among the modules in a different manner than described herein.

The content module 123 receives content, e.g., recipes, from the content source 110 and stores the received recipes in database accessible to the other component of the recommendation server 120, e.g., the recommendation module 125. The content module 123 may optionally analyze the received recipes to enable more efficient organization of the recipes and thus enable fast access to the recipes by the recommendation module 125. The content module 123 also handles content requests, e.g., requests for recipes, from users of the client devices 130. In general, the content module 123 receives a request for recipes (e.g., recommended recipes) from a client device 130 and responds to the request by providing the requested recipes. The content module 123 may also push recommended recipes to the client device 130 for a user to review.

The recommendation module 125 determines recommended recipes for users based on history of user activities, the content of recipes, or a combination thereof. For example, the recommendation module 125 may receive user activity data describing user activities from the client device 130 or other external sources (e.g., third party servers) through web crawling. Recommendation of recipes based on user activities may be referred to as "item-based recommendation." Alternatively, the recommendation module 125 may analyze the content of the recipes. Recommendation of recipes based on content of recipes or features extracted from the content may be referred to as "content-based recommendation." A combined set of recommendations refers to combining the recommended recipes resulting from the two types of recommendations. The recommendation module 125 transmits the recommended recipes to the client device 130 for providing the recommended recipes to the users. An exemplary recommendation module 125 is described in more detail below with reference to FIG. 3.

A client device 130 is an electronic device used by one or more users to perform functions such as consuming digital content, executing software applications, browsing websites hosted by web servers on the network 140, downloading files, and interacting with the recommendation server 120. Example client devices 130 include a desktop, a laptop, a tablet, a mobile device, a smart television, and a wearable device. The client device 130 includes and/or interfaces with a display device that presents content (e.g., recipes displayed on a hosting website) to the user. In addition, the client device 130 provides a user interface (UI), such as physical and/or on-screen buttons, with which the user may interact with the client device 130 to perform functions such as viewing, selecting, commenting on, acknowledging, sharing, and purchasing content hosted by websites, or connecting with other users on social networks.

In one embodiment, the client device 130 includes a presentation module 135. Other embodiments of the client device 130 include different and/or additional modules. In addition, the functions may be distributed among the modules in a different manner than described herein.

The presentation module 135 obtains and presents the recommended recipes to the user of the client device 130. In one embodiment, the presentation module 135 may collect user activity data describing activities performed by the user using the client device 130. The presentation module 135 may provide the user activity data to the recommendation server 120 to facilitate both the item-based and content-based recommendation of recipes to the user. In addition, the presentation module 135 requests recommended recipes from the recommendation server 120 and displays the recommended recipes to the user responsive to a particular action of the user, such as the user's opening the recipe hosting website, or clicking on "recommendation" functional component of the recipe hosting website, etc. Alternatively, the presentation module 135 receives periodically updated recommendation of recipes from the recommendation server 120 and automatically presents updated recommendation of recipes to the user.

The network 140 enables communications among the content source 110, the recommendation server 120, and client devices 130 and can comprise the Internet. In one embodiment, the network 140 uses standard communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The network 140 may include multiple sub-networks linked to transfer data.

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Computer System

Figure 2:
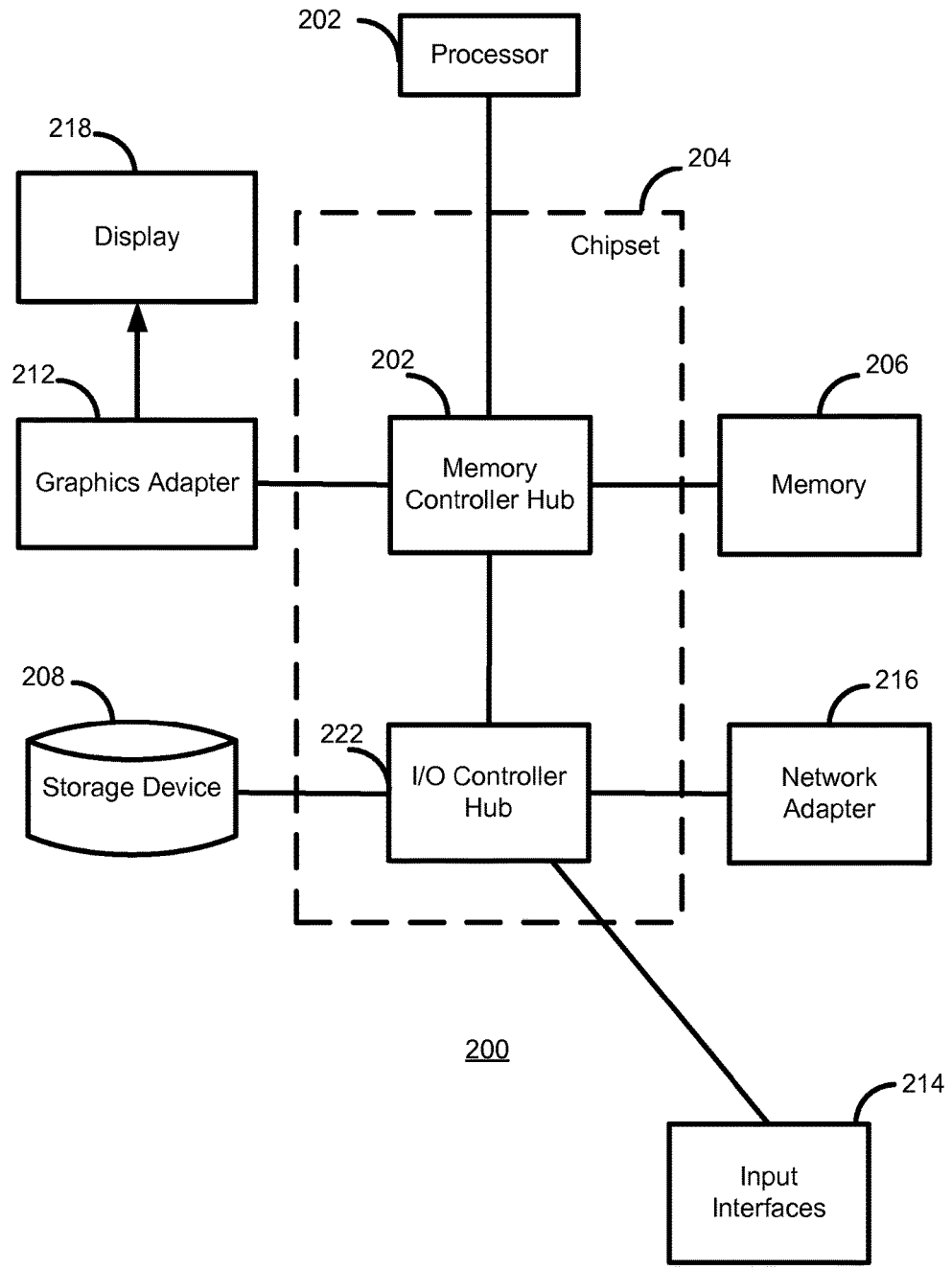
FIG. 2 is a block diagram illustrating an example computer for implementing entities in FIG. 1, according to one embodiment.

FIG. 2 is a block diagram illustrating an example computer for implementing entities in FIG. 1, according to one embodiment. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, input interfaces 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interfaces 214 may include a touch-screen interface, a mouse, track ball, or other type of pointing device, a keyboard, a scanner or other conventional digitizer, or some combination thereof, and is used to input data into the computer 200. The graphics adapter 212 displays images and other information on the display 218. The network adapter 216 couples the computer 200 to one or more computer networks.

The computer 200 is adapted to execute computer program modules (e.g., the content module 123, the recommendation module 125). As used herein, the term "module" refers to computer program logic used to provide the specified functionality. Thus, a module may be implemented in hardware, firmware, and/or software. In one embodiment, program modules are stored on the storage device 208, loaded into the memory 206, and executed by the processor 202.

The type of computer 200 used by the entities of the environment 100 can vary depending upon the embodiment. For example, the content source 110 or recommendation server 120 may include multiple computers 200 communicating with each other through the network 140 to provide the functionality described herein. Such computers 200 may lack some of the components described above, such as graphics adapters 212 and displays 218. As another example, the client device 130 is implemented on a mobile device, laptop, or tablet containing at least some of the components of the computer 200.

Recipe Recommendation

Figure 3:
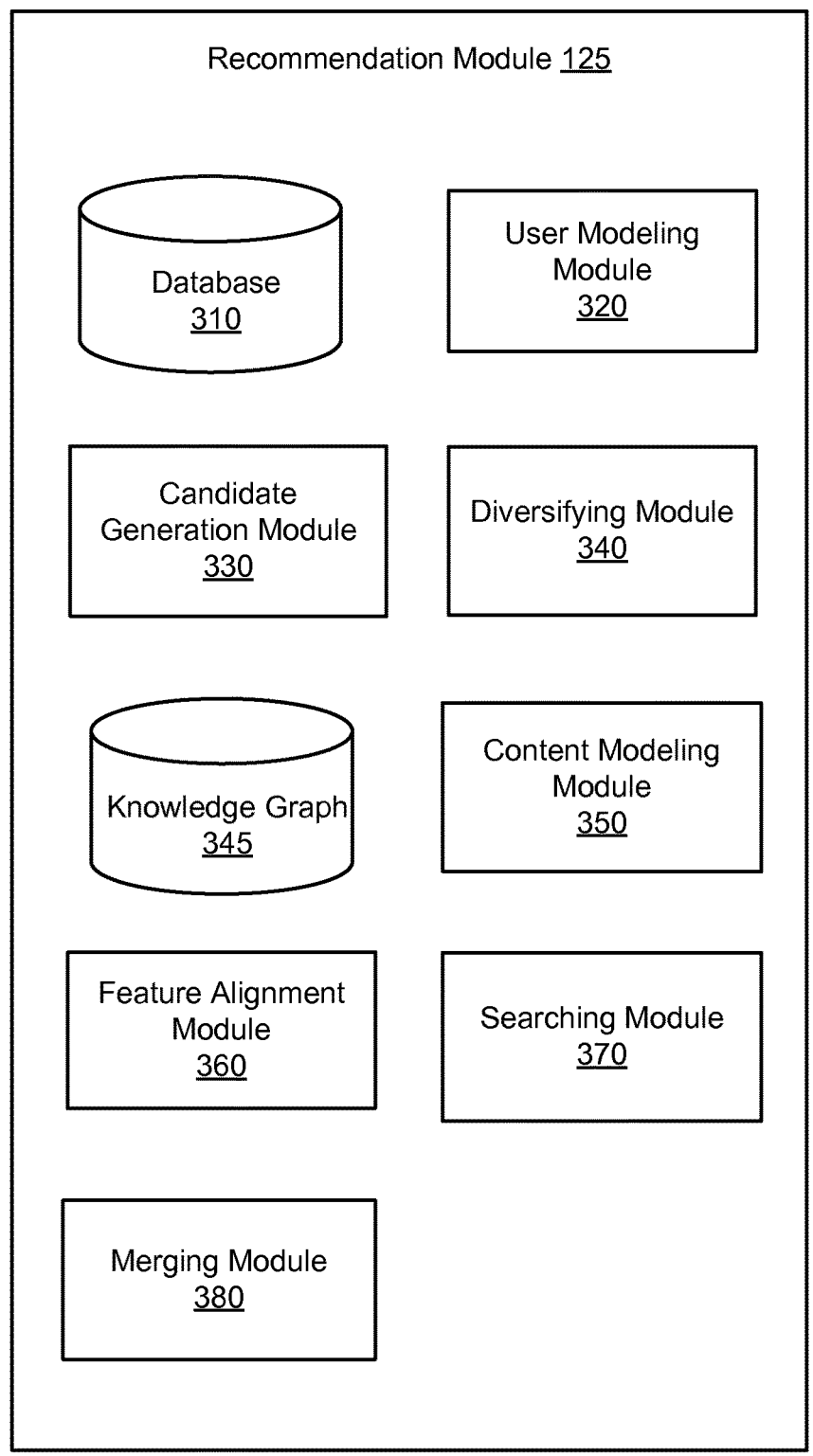
FIG. 3 is a high-level block diagram illustrating a recommendation module of a recommendation server according to one embodiment.

FIG. 3 is a high-level block diagram illustrating the recommendation module 125 of the recommendation server 120 according to one embodiment. In the embodiment shown, the recommendation module 125 has a database 310, a user modeling module 320, a candidate generation module 330, a diversifying module 340, a knowledge graph 345, a content modeling module 350, a feature alignment module 360, a searching module 370 and a merging module 380. Those of skill in the art will recognize that other embodiments of the recommendation module 125 can have different and/or additional modules other than the ones described here, and that the functions may be distributed among the modules in a different manner.

The database 310 stores user activity data received from the client devices 130 or obtained from other external sources by web crawling, and recipes obtained by the content module 123 from the content sources 110. In some embodiments, the database 310 also stores other data used by the modules within the recommendation module 125 to implement the functionalities described herein.

The user modeling module 320 receives user activity data describing user activities from the client devices 130 or other external sources such as third party servers, and generates user models based on the user activity data. User activities may include user interaction with content hosted by websites, for example a user searching, viewing, selecting, commenting on, acknowledging (such as positively acknowledging/endorsing, negatively acknowledging), sharing, and purchasing content hosted by websites. User activities may also include user connection or interaction with other users on social networks, such as adding other users as social connections, accepting other users' invitations for connection, sending and receiving messages to and from other users, audio/video conferencing with other users, etc. In another example, a user may also create and update a profile on a website. Yet other examples for user activities known to those of skill in the related art are possible.

Each action of users, either being the interaction with content, or interaction with other users, can be referred to as an event. The event may also be annotated with metadata describing a time, a type or an object (or item) related to the event. Take the example of a user endorsing a recipe, which can be referred to as an event, this event has a time indicating when the user endorsed the recipe, a type— positively acknowledged or endorsed, and an object (or item)—the recipe. Other types of events can include negatively acknowledged, not interested, etc. The type of "not interested" may indicate that the user clicked or viewed the object (such as the recipe), but neither positively acknowledged nor negatively acknowledged it. The object (such as a recipe) can also be associated with the time and type of the event related to the object. For example, the recipe has a time when the user endorsed, and a type—positively acknowledged. For example, if the user endorsed the recipe at 9:46 PM on Aug. 15, 2013, then for this user, the recipe has a time of 9:46 PM on Aug. 15, 2013. Another example of the object can be a search query. A related event can include a user issuing the search query.

In one embodiment, a user model may describe behaviors of a user. A user model may also describe user preferences based on activities of the user. For example, a user model describes that a user is interested in cooking and the user's favorite foods include, for example, Thai food, all kinds of deserts having chocolate in them, spicy dishes, etc. The user model can be determined by the user modeling module 320 based on parsing and analyzing activity data of the user, for example, including the dishes and/or recipes that the user has endorsed or favorably commented on, the content of the user's profile that indicates the user's interests, the messages sent or received by the user indicating the user's interests, interests of other users who are connected with the user (e.g., the user's friends), etc., as well as metadata associated with the activities. In another example, the user model for the user may also describe other preferences of the user, e.g., disliked ingredients in food, liked or disliked diets, etc.

Additionally, the user modeling module 320 analyzes the time, the type and the object of the events, and determines co-occurrence statistics of pairs of the events. For example, by analyzing events related to recipes hosted on a website, the user modeling module 320 determines how many times any two recipes have been in the same user sessions. Based on the co-occurrence statistics of events, the user modeling module 320 generates a user model describing relationships between the recipes. For example, the user model for a user can predict the likelihood that the user will be interested in a recipe, given that the user is interested in another recipe. In other words, the user model can estimate the probability that if the user likes (e.g., endorses) a first recipe, the user will also like (or even endorse) a second recipe. Further, if a first recipe has been in the same user sessions with a second recipe for more times than with a third recipe, the user model predicts that if the user likes the first recipe, the likelihood that a user will also like the second recipe is larger than the likelihood that the user will also like the third recipe. In another example, the statistics of events can be used to estimate similarities between search queries and recipes. For example, users who searched for "pie" often clicked on "grandma's pumpkin pie." Therefore, the user modeling module 320 can utilize the statistics to establish relationships between search queries and recipes. A corresponding user model thus predicts the likelihood that if the user issues a search query, the user will be interested in a recipe.

In one embodiment, a recipe-to-recipe table can be formed based on the user model. Specifically, assume that the user endorses a recipe for cooking "teriyaki chicken." The user model can predict the likelihood that the user will also like a recipe for "blueberry muffin," or a recipe for "lemon shrimp." Furthermore, the user model can predict the likelihood that if the user likes the recipe for "blueberry muffin," the user will also like a recipe for "mocha smoothies." Accordingly, the user model can predict likelihood from one recipe to another recipe, and therefore relationships between recipes can be formed, and stored in a recipe-to-recipe table. The recipe-to-recipe table may have entries, e.g., (a first recipe, a second recipe, likelihood), and be stored in the database 310, accessible to other components of the recommendation module 125, such as the candidate generation module 330.

In one embodiment, the user modeling module 320 applies machine learning techniques to build the user model. For example, for each user, the user modeling module 320 may split the events into two portions by time. The user modeling module 320 may select features based on the first portion of events, and generate a user model using the selected features. The user modeling module 320 may train the user model based on the second portion of events by performing prediction using the generated user model and comparing the prediction results to the second portion of events. The user modeling module 320 refines the user model based on the comparison between the prediction results and the second portion of data. The candidate generation module 330 applies the user model to generate candidate recipes that can be further processed to produce recommended recipes for the user. In one embodiment, for a user, the candidate generation module 330 identifies multiple seed recipes from events related to the user. For example, if a user endorsed a recipe, then the recipe can be used as a seed recipe. The types of the events related to the seed recipes (also referred to as the types of the seed recipes) can include, for example, positively acknowledged, negatively acknowledged, not interested, etc. A seed recipe also has a time that can be the time of the event related to the seed recipe. For example, if a user endorsed a recipe for "lemon shrimp" at 9:46 PM on Aug. 15, 2013 and the recipe is identified as a seed recipe, this time—9:46 PM on Aug. 15, 2013 is associated with the seed recipe for the user. The candidate generation module 330 may use all recipes in the events related to the user as seed recipes. Alternatively, the candidate generation module 330 may only use a portion of the events related to the user to identify the seed recipes. For example, the candidate generation module 330 may leave some positively acknowledged recipes to train a ranking algorithm, which will be describe in detail below.

The candidate generation module 330 determines a certain number of candidate recipes based on the seed recipes. For purpose of clarity, the seed recipes may be referred to as a first level of recipes. In one embodiment, the candidate generation module 330 determines a next level (e.g., a second level) of recipes based on the first level of recipes using the user model or the recipe-to-recipe table. For example, for each recipe in the first level, if the likelihood is higher than a threshold that provided the user likes a first recipe the user will also like a second recipe, the second recipe can be determined as a recipe in the next level. Therefore, a transition from the recipes of the first level to the recipes of the next level can be formed. The likelihood associated with the transition can be referred to as a transition probability. In another example, the candidate generation module 330 searches the recipe-to-recipe table to identify a predetermined number of next level of recipes with the highest transition probabilities from each seed recipe.

Similarly, the candidate generation module 330 can determine another next level (e.g., the third level) of recipes transiting from the determined next level (e.g., the second level) of recipes. For example, for each recipe in the second level, the candidate generation module 330 may identify a recipe of the third level by determining whether the likelihood from the recipe in the second level to the recipe in the third level is higher than a threshold. Alternatively, the candidate generation module 330 may identify third level recipes transiting from each of the recipes in the second level if their transition probabilities are the highest.

In one embodiment, the candidate generation module 330 can repeat the process for each subsequent level of recipes until a predetermined number of levels are reached. Examples for the predetermined number of levels can include, five, six, 10, 15, etc. The identified recipes in the predetermined number of levels are referred to as candidate recipes. In another embodiment, the candidate generation module 330 can continue identifying candidate recipes transiting from a previous level until a predetermined number of candidate recipes have been identified. For example, the candidate generation module 330 may identify 1,000 to 2,000 candidate recipes.

In one embodiment, for each candidate recipe, the candidate generation module 330 may track one or more different paths leading to the candidate recipe. A path can include recipes (e.g., a seed recipe, one or more candidate recipes) and transitions between the recipes. For example, a path leading to a candidate recipe in a third level may include the seed recipe, a second level recipe associated with a transition probability for the transition from the seed recipe, a third level recipe associated with a second transition probability for the transition from the second level recipe. Further, based on the one or more paths, the candidate generation module 330 can calculate a decay time for the candidate recipe. For example, the decay time for the candidate recipe can be the log of the time difference between the seed recipe action time and the current time.

In addition, the candidate generation module 330 also determines the numbers of seed recipes with different types. For example, three positively acknowledged seed recipes all lead to a candidate recipe, while one negatively acknowledged seed recipe leads to the candidate recipe. Therefore, the candidate generation module can calculate the maximum, minimum and/or average transition probabilities for each type of seed recipe. For example, if the three positively acknowledged seed recipes take three different paths to reach the candidate recipe, the probabilities of all transitions in each path can be added to obtain a transition probability for each path. The candidate generation module 330 can determine a maximum and a minimum transition probability for the three paths, and an average value of the three transition probabilities for the positively acknowledged type of seed recipe.

In one embodiment, the candidate generation module 330 ranks the candidate recipes. For example, the candidate generation module 330 may rank the candidate recipes based on the transition probabilities, the decay time and/or the numbers of different types of seed recipes, etc., associated with the candidate recipes. The candidate generation module 330 can generate a ranking score for each candidate recipe. Furthermore, the candidate generation module 330 may apply logistic regression techniques to rank the candidate recipes. Among the ranked candidate recipes, the candidate generation module 330 may select a certain number of candidate recipes with the highest ranking score as recommended recipes for the user.

The diversifying module 340 diversifies the recommended recipes for the user. In one embodiment, the diversifying module 340 penalizes recommended recipes transiting from the same seed recipe. For example, the diversifying module 340 limits candidate recipes transiting from the same seed recipe to a predetermined number, e.g., five, 10, 15, 20, etc. Alternatively, the diversifying module 340 may apply exponential decay to penalize the number of candidate recipes transiting from the same seed recipe. Other types of diversification of recommended recipes known to those of skill in the related art are possible. By diversifying the recommended recipes, the user is provided more variety in results.

The knowledge graph 345 establishes relationships that are explicit and not explicit in the recipes. In one embodiment, the knowledge graph 345 contains a graph representing food knowledge. The nodes of the graph represent ingredients, ingredient abstractions, cooking techniques, and cooking equipment. Example nodes of the graph include "apple," "gala apple," "fruit," "slicing," "peeling," "knife," and "peeler." Ingredient abstractions are broader categories of ingredients. For example, "steak" is an abstraction of "rib-eye steak." A node may be an abstraction with respect another node and an ingredient with respect to another node. For example, "beef" is an abstraction of "Wagyu beef," and "meat" is a further abstraction of "beef."

The nodes of the food knowledge graph 345 may contain attributes of a particular object on the graph. For example, nodes representing ingredients contain nutritional density information and associated allergens and dietary restrictions. Nodes representing abstractions may similarly contain average nutritional density information as well as attributes (e.g., allergens such as gluten or nuts, dietary restrictions such as halal, vegan, or kosher) common to child ingredients of a parent abstraction. As another example, nodes representing cooking techniques and cooking equipment indicate difficulty of using cooking equipment or learning a cooking technique.

Nodes of the food knowledge graph 345 are connected by edges that indicate relationships between the nodes. The food knowledge graph has different types of edges representing different relationships, and two nodes may be connected by more than one edge. For example, one type of edge explicitly indicates the parent-child relationship between an ingredient and an abstraction (e.g., "black beans are a kind of beans"). Another type of edge between two nodes representing two ingredients indicates that the ingredients have equivalent nutritional content (e.g., "a Fuji apple is the nutritional equivalent of a gala apple"). Edges may connect similar nodes, such as an edge representing substitutability between ingredients represented by two nodes. An edge between a node representing an ingredient and a node representing cooking equipment or a cooking technique indicates that the cooking equipment or technique is commonly used with that ingredient (e.g., "potatoes are often used with ovens," "potatoes are often baked"). Similarly, an edge between a node representing a cooking technique and a node representing cooking equipment indicates that the cooking equipment may be used in a cooking technique (e.g., "an oven is used for baking").

In addition to ingredients, abstractions of ingredients, cooking techniques, and cooking equipment, the knowledge graph 345 may contain nodes representing units of measure (e.g., cup, ounce, cubic centimeter, pinch). These nodes may have attributes indicating common abbreviations of the unit of measure, and edges between these nodes may represent unit conversions between dimensionally consistent units of measure. Hence, the nodes, attributes of nodes, and edges between nodes serve to organize food knowledge into the knowledge graph 345. One or more components of the recommendation module 125 draw upon the food knowledge in the knowledge graph 345 to generate features of recipes and ultimately to generate recommended recipes for a user.

The content modeling module 350 receives content such as a plurality of diverse recipes and generates a content model for aligning the features from the recipes. In one embodiment, the content modeling module 350 extracts features from the received recipes based on the food knowledge graph 345. For example, features of a recipe may include an ingredient used in the recipe, an allergy that may be triggered by the recipe, nutrition of the recipe, taste, calories, fat, price, a cuisine (e.g., an Italian recipe, a Thai recipe, a Japanese recipe, etc.), a source of the recipe, a course (e.g., an appetizer, a dessert, etc.), a brand used in the recipe, a diet (e.g., a low-carb/high-protein recipe, a low-sugar recipe), dish (e.g., teriyaki chicken, lemon shrimp), a cooking technique used in the recipe, preparation time based on the recipe, preparation difficulty estimated based on the recipe, an associated holiday (e.g., an Easter recipe, a Halloween recipe, a Thanksgiving recipe, etc.), etc. Other examples for features of recipes known to those of skill in the related art are possible.

In one embodiment, the content modeling module 350 converts each recipe into a feature set. The content modeling module 350 may parse the content of the recipe to generate a feature set including one or more features of the recipe. The feature set for a recipe can be inferred with reference to the knowledge graph 345. For example, for a recipe for making "teriyaki chicken," the content modeling module 350 may generate a feature set including multiple ingredient features (such as chicken thigh, fresh ginger, soy source, mirin), multiple nutrition features (such as cholesterol, sodium, potassium, carbohydrate, vitamin A, vitamin B, calcium, iron), multiple taste features (such as salty, savory, sour, bitter, sweet) and a cuisine feature (such as Japanese cuisine). The feature set for the recipe may also include one or more preparation features, for example, preparation time, preparation difficulty, etc. For example, the preparation time can be classified as long (such as more than one hour), medium (from one or hour to half an hour), short (from half an hour to 15 minutes), and super short (less than 15 minutes), etc. The preparation difficulty can be classified as hard, medium, easy, super easy, etc. Accordingly, the recipe for "teriyaki chicken" has a preparation time feature as medium and a preparation difficulty feature as easy. Furthermore, the feature set may also include one or more cooking technique features. For example, the cooking technique features can be grill, deep fry, stir fry, blending, slow cooking, stew, cold serving, etc. The recipe for "teriyaki chicken" has a cooking technique feature of grill.

The content modeling module 350 generates a content model for aligning from a first set of features to a second set of features. In one embodiment, the content model may be used to align each feature in a first feature set for a first recipe to all features in a second feature set for a second recipe and also to assign a probability for each alignment between the features. In one embodiment, the content modeling module 350 may apply translation techniques to build the content model. For example, the content model may treat each feature in the feature sets as a word. The content modeling module 350 translates features from one set to features in another set and also calculates a probability associated with each translation. For example, the probability is an indicator for the correctness of the translation. By applying the translation technique to the recipe feature alignment, the probability for each alignment between the features may indicate a similarity between the two aligned features. Accordingly, by aligning all features of a first recipe to all features of a second recipe and calculating a total or average alignment probability, the similarity between the two recipes can be determined. To train the content model, recipe-to-recipe pairs are generated. For example, the content modeling module 350 can use user activities and/or frequently co-occurring recipes to construct such a training set including multiple recipe-to-recipe pairs.

In some alternative embodiments, the content modeling module 350 may build a content model for aligning features between recipes based on the knowledge graph 345. For example, the content modeling module 350 learns relationships (e.g., parent-child relationship, nutritionally equivalent relationship, etc.) between the features from the knowledge graph 345 and generates the content model for assigning likelihood to each matching between the features. In one embodiment, the content model can also assign a fertility indicator to each alignment. The fertility indicator indicates how important alignments from a given feature are and can be used to improve the ranking function.

The feature alignment module 360 receives a feature set for a recipe and aligns features in the feature set to other features using the content model. In one embodiment, the feature alignment module 360 identifies a recipe that a user has endorsed, as a seed recipe, and retrieves the feature set for the seed recipe. The feature alignment module 360 aligns the features in the feature set for the seed recipe to multiple other features using the content model. For example, a feature set for a recipe of "teriyaki chicken" includes ingredient features (such as chicken thigh, ginger, soy source, mirin), taste features (such as salty, savory, sour, bitter, sweet) and a cuisine feature (such as Japanese cuisine). The feature alignment module 360 may align each of the ingredient features for "teriyaki chicken" recipe to a group of other ingredient features. For example, the feature alignment module 360 aligns "chicken thigh" to other ingredient features, such as "chicken breast," "chicken wing," "turkey," "beef," "pork," "broccoli," "green pepper," "olive oil," "horseradish," etc. The feature alignment module 360 may also align each of the taste features to a group of other taste features, and align the cuisine feature to a group of other cuisine features. Furthermore, the feature alignment module 360 may align between different types of features. For example, the feature alignment module 360 can align a cuisine feature to a taste feature.

In one embodiment, the feature alignment module 360 determines an alignment probability for each alignment between the features using the content model. For example, the feature alignment module 360 determines probability for alignment between "chicken thigh" and "chicken breast" as 93%, probability for alignment between "chicken thigh" and "chicken wing" as 96%, probability for alignment between "chicken thigh" and "turkey" as 68%, probability for alignment between "chicken thigh" and "beef" as 46%, probability for alignment between "chicken thigh" and "pork" as 45%, probability for alignment between "chicken thigh" and "broccoli" as 7%, probability for alignment between "chicken thigh" and "green pepper" as 9%, probability for alignment between "chicken thigh" and "olive oil" as 8%, probability for alignment between "chicken thigh" and "horseradish" as 15%, etc.

In one embodiment, the feature alignment module 360 generates an aligned feature set associated with the feature set of the seed recipe based on the alignment between the features of the seed recipe and the other features. Accordingly, the aligned feature set includes features aligned from the features of the seed recipe. In addition, the aligned feature set may also include an alignment probability associated with each feature in the set. For example, a portion of the aligned feature set for the recipe of "teriyaki chicken" may include the features aligned from the "chicken thigh", each annotated with a corresponding alignment probability, e.g., "chicken breast," 93%; "chicken wing," 96%; "turkey," 68%; "beef," 46%; "pork," 45%; "broccoli," 7%; "green pepper," 9%; "olive oil," 8%; "horseradish," 15%.

In one embodiment, the feature alignment module 360 aggregates each aligned feature set for each of the identified seed recipes for the user and generates a ranking function. For example, the identified seed recipes can be recipes the user has endorsed. The feature alignment module 360 generates an aligned feature set for each seed recipe using above-described approach and aggregates the aligned feature sets for the identified seed recipes into the ranking function. The ranking function includes a set of features aligned from the features of the seed recipes, and a ranking score (e.g., the alignment probability) associated with each feature. In one embodiment, the ranking function may also incorporate the fertility indicator for each feature to indicate the importance of the each feature.

The searching module 370 searches for recommended recipes using the ranking function. In one embodiment, the searching module 370 may use the ranking function to rank recipes obtained from the content source 110. For example, the searching module 370 matches features in the obtained recipes to the features of the ranking function and determine a ranking of the recipe based on the feature's scores indicated by the ranking function. The ranking, e.g., a ranking score, of the recipe indicates how similar the recipe is to the seed recipes that the user has endorsed. In other words, the ranking score of the recipe may indicate likelihood that the user will also like the recipe given the user endorsed the seed recipes. In one embodiment, the searching module 370 may use a query to search for recommended recipes. The query specifies the selected features and their scores.

In an alternative embodiment, the searching module 370 determines features that can be included in the recommended recipes based on the ranking function. For example, the searching module 370 may randomly select a group of features in the ranking function and use the group of features to search for recommended recipes. Alternatively, the searching module 370 may select features with the highest score (alignment probability) to form a group of features for recommended recipes. In one embodiment, the searching module 370 may exclude or limit trivial alignments such as one-to-one alignments (e.g., from "broccoli" to "broccoli"). In this way, the resulting recommended recipes will be less obvious and more surprising to the user.

Furthermore, the searching module 370 may select features from the ranking function based on a predetermined distribution of their scores. For example, the searching module 370 may divide the score into a number of buckets and select a certain number of features in each bucket. Alternatively, the searching module 370 may only select features from one or more certain buckets. In addition, the searching module 370 may select features based on the fertility indicator, which indicates the importance of the features in the alignment.

The merging module 380 selects recommended recipes to maintain the same distribution of certain features for the user. These certain features may include the course feature and the type of recipe source (e.g., large website, blog, etc.) For example, if the user has explicitly indicated some recipes as liked ones, e.g., endorsed recipes, among which 30% are desserts, then the merging module 380 selects 30% dessert recipes from the merged recommended recipes. In another example, if the user prefers recipes obtained from blogs to recipes obtained from large websites, then the merging module 380 selects more recommended recipes from blogs than recommended recipes from large websites. Furthermore, the merging module 380 may select a certain number of top ranked recommended recipes for each feature so that the proportion of the resulting recommended recipes for each feature is maintained.

In one embodiment, the merging module 380 filters the recommended recipes based on user preferences or interests described by the user model. As described above, a user model may indicate what the user likes and what the user dislikes. The merging module 380 may compare the user preferences described by the user model with the features of the recommended recipes and removes the recommended recipes having features the user dislikes. For example, the user model indicates that the user dislikes garlic. The merging module 380 compares "garlic" with all the features in each recommended recipe and excludes the recommended recipes having garlic as an ingredient.

In one embodiment, the merging module 380 merges the recommended recipes determined by the candidate generation module 330 or the diversifying module 340 using item-based recommendation and the recommended recipes determined by the searching module 370 using content-based recommendation, and provides the resulting recommended recipes to the client device 130. For example, the merging module 380 normalizes the ranking scores of the recommended recipes from both models and merges the recommended recipes based on an exponential decay on the normalized scores. Accordingly, the merged result can include a mix of item-based recommended recipes and content-based recommended recipes.

As a result, the item-based recommendations, the content-based recommendations, and a combination of them can thus be achieved. Other embodiments to achieve recipe recommendations are also possible. For example, the seed recipes can be replaced by other seed objects, where the seed objects can be search queries, recipe sources, user-created collections of recipes, etc. Furthermore, the recipe-to-recipe tables can be replaced with analogous object-to-recipe tables using the methods described previously. For example, if users who search for "pie" (a search query type of seed object) often click on "grandma's pumpkin pie" (a recipe), the corresponding entry in the object-to-recipe table would be a high value. Similarly, the content modeling module 350 may parse the content of these other types of objects to generate feature sets. For example, features for a search query may be words or phrases in the search string; and features for a recipe source may be tags on the source such as difficulty or diet.

Exemplary Methods

Figure 4:
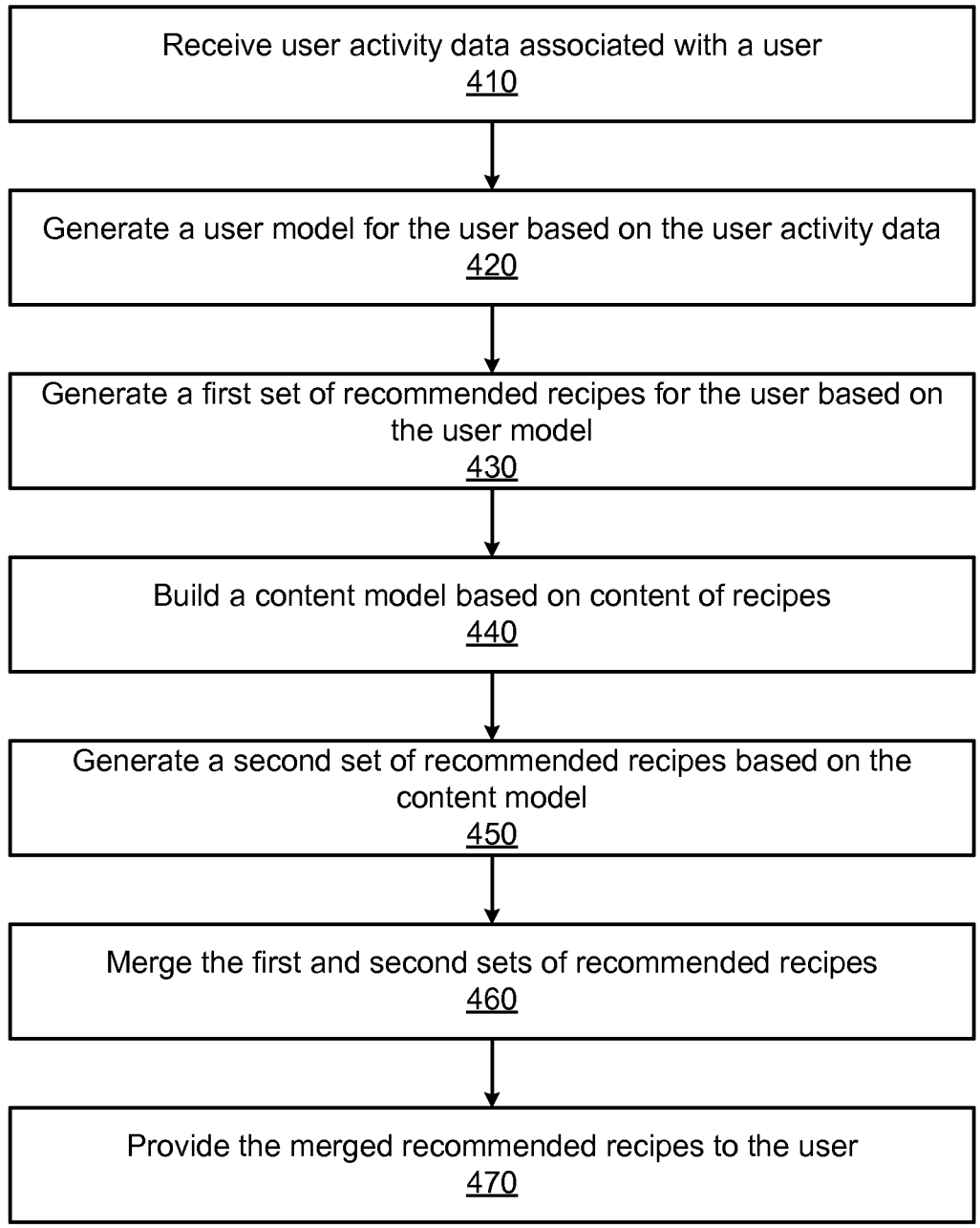
FIG. 4 is a flowchart illustrating a method for providing recommended recipes to a user according to one embodiment.

FIG. 4 is a flowchart illustrating a method for providing recommended recipes to a user according to one embodiment. The method begins in step 410 by receiving user activity data associated with a user. The user activity data associated with a user can describe the user's interactions with content hosted by websites, or the user's interactions with other users on social networks. The user activity data can be received from the client device 130 of the user, or other external sources, such as third party servers.

In step 420, a user model for the user is generated, for example, based on the user activity data. The user model may describe preferences of the user, for example, what the user likes and what the user dislikes. For example, the user model may describe the user likes chocolate, and dislikes ginger as an ingredient of food. Alternatively or additionally, the user model can estimate the likelihood that if the user likes a recipe, the user will also like another recipe.

In step 430, based on the user model, a first set of recommended recipes for the user is generated. A method of generating recommended recipes for a user based on a user model is described in detail with reference to FIG. 5.

In step 440, a content model is built based on content of recipes. The content model can be generated by the content modeling module 350 based on analysis of the content of various recipes. Example of extracted features of a recipe include an ingredient used in the recipe, an allergy that may be triggered by the recipe, nutrition of the recipe, taste, calories, fat, price, a cuisine, a source of the recipe, a course, a brand used in the recipe, a diet, dish, a cooking technique used in the recipe, preparation time based on the recipe, preparation difficulty estimated based on the recipe, an associated holiday and many others. The content modeling module 350 builds a content model for aligning different features from recipes.

In step 450, a second set of recommended recipes for the user is generated based on the content model. A method for generating recommended recipes based on a content model is described in detail with reference to FIG. 6.

Figure 6:
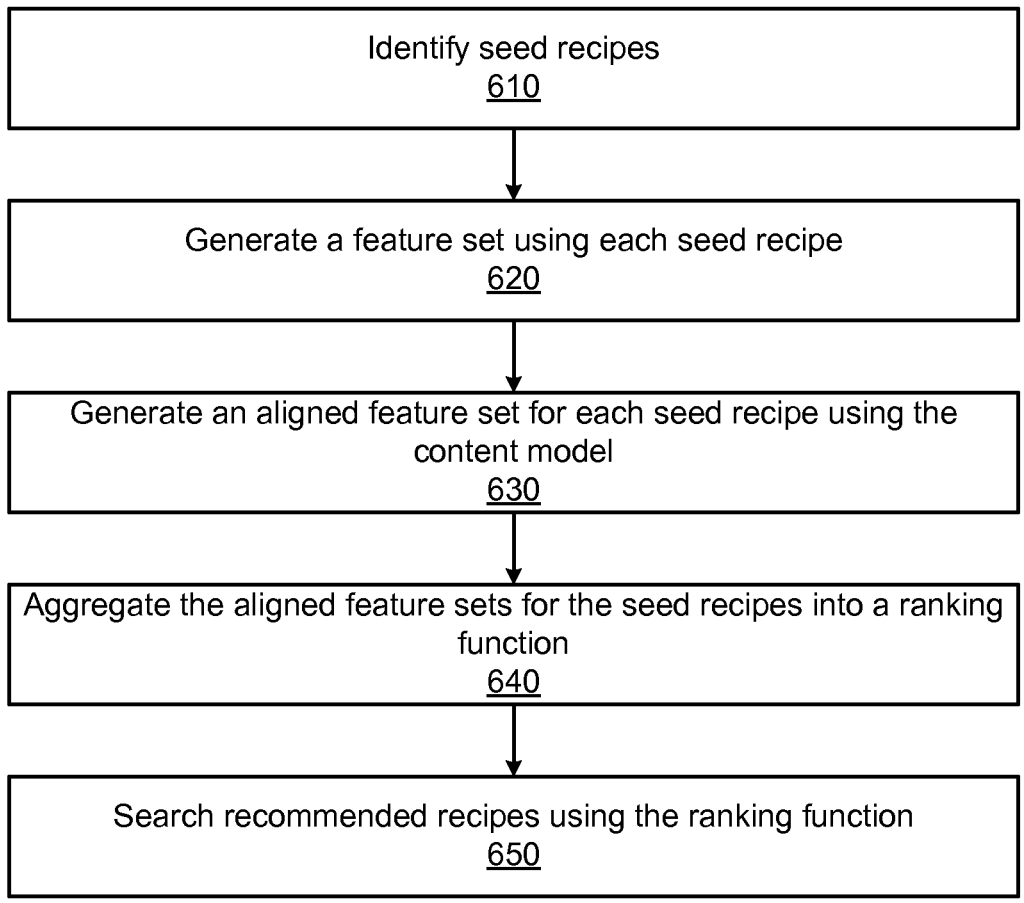
FIG. 6 is a flowchart illustrating a method for generating recommended recipes based on a content model according to one embodiment.
Figure 7:
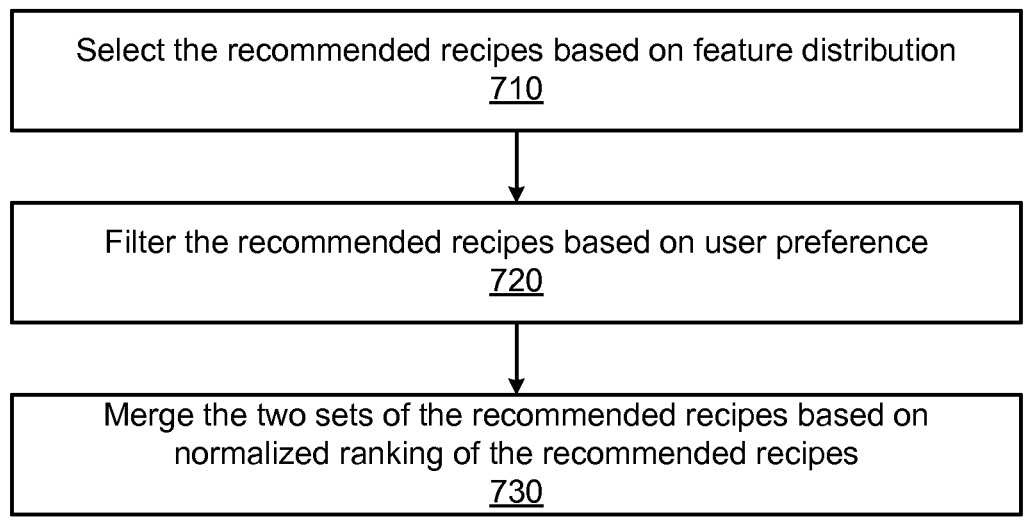
FIG. 7 is a flowchart illustrating a method for combining the recommended recipes resulting from the methods illustrated in FIG. 5 and FIG. 6, according to one embodiment.

In step 460, the first set of recommended recipes and the second set of recommended recipes are merged. A method of combining the recommended recipes resulting from the methods illustrated in FIG. 5 and FIG. 6, is illustrated in FIG. 7.

In step 470, the merged recommended recipes are provided to the user. The merged recommended recipes or at least some of the merged recommended recipes are transmitted to the presentation module 135 of the client device 130 for display to the user.

Figure 5:
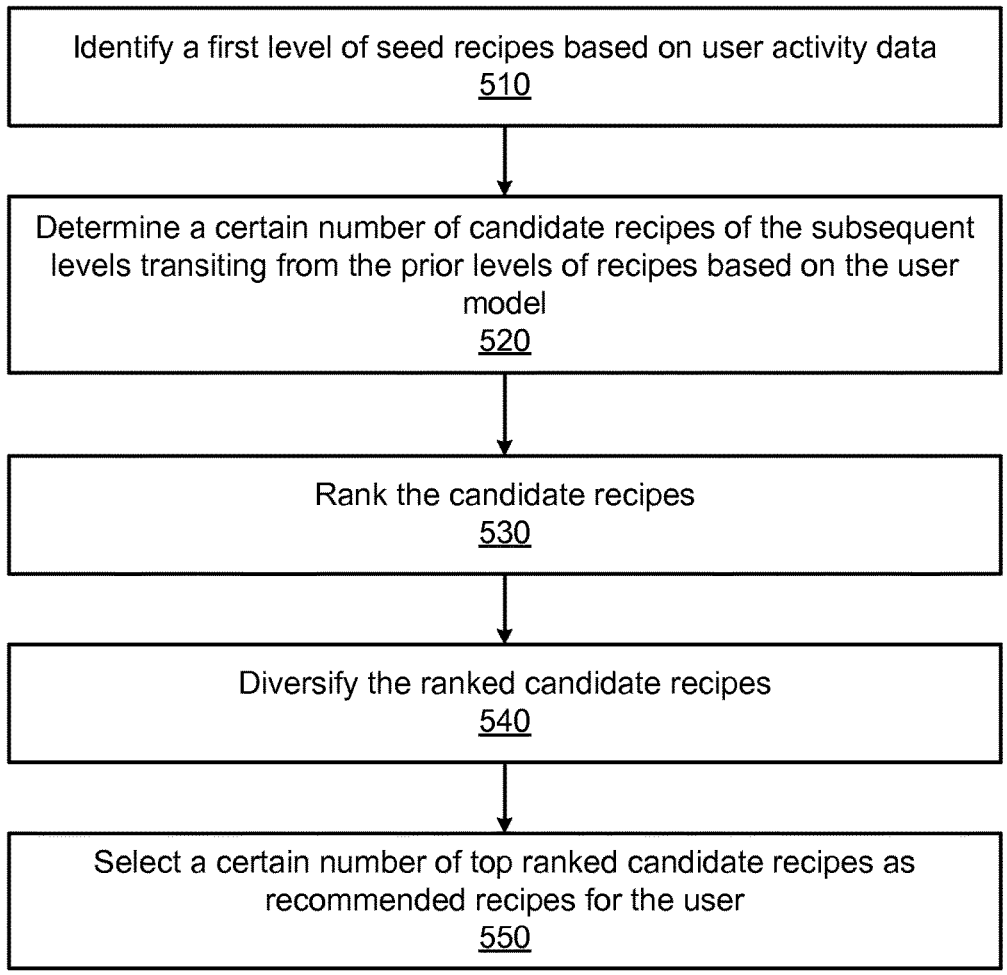
FIG. 5 is a flowchart illustrating a method for generating recommended recipes for a user based on a user model according to one embodiment.

FIG. 5 is a flowchart illustrating a method for generating recommended recipes for a user based on a user model according to one embodiment. In other examples, additional or alternative steps may be performed or the steps may be performed in other orders.

In step 510, a first level of seed recipes is identified based on user activity data. The seed recipes can be identified by the candidate generation module 330 by referencing the user's activities. In addition, the candidate generation module 330 may select different types of seed recipes. For example, the seed recipes may include recipes endorsed by the user, negatively acknowledged by the user, or viewed but uninterested to the user.

In step 520, a certain number of candidate recipes of subsequent levels are determined based on the user model. The subsequent levels of candidate recipes are associated with transition probabilities from the prior levels of recipes. The seed recipes are considered as recipes of the first level. From an identified seed recipe, a recipe of the next level can be determined and annotated with a transition probability describing the transition from the seed recipe. The transition probability can be estimated, for example, by estimating the likelihood/probability that if the user likes the seed recipe, the user will also like the recipe in the next level, using the user model. By repeating the transition from each recipe of a prior level to a recipe of the subsequent level, a certain number of candidate recipes of subsequent levels are determined.

In step 530, the candidate recipes are ranked, e.g., using a logistic regression technique. In step 540, the ranked candidate recipes are diversified. For example, the diversifying module 340 penalizes the candidate recipes transiting from the same seed recipe by limiting the number of candidate recipes from each seed recipe. In step 550, a certain number of top ranked candidate recipes are selected as recommended recipes for the user. For example, the top 400 candidate recipes are selected to display to the user as recommended recipes.

FIG. 6 is a flowchart illustrating a method for generating recommended recipes based on a content model according to one embodiment. The method illustrated in FIG. 6 begins in step 610 by identifying seed recipes. For example, the seed recipes may be the recipes endorsed by the user. In step 620, a feature set is generated using each seed recipe. Each seed recipe is parsed and features in the seed recipe are extracted to form a feature set for the seed recipe.

In step 630, an aligned feature set for each seed recipe is generated using the content model. The content model is used to align the features in the feature set of the seed recipe with other features and a probability is calculated for each alignment based on the content model.

In step 640, the aligned feature sets for the seed recipes are aggregated into a ranking function. The feature alignment module 360 aggregates the aligned feature sets for all identified seed recipes into a ranking function. The ranking function includes a set of aligned features and an alignment probability (ranking score) associated with each feature.

In step 650, recommended recipes are searched using the ranking function. The ranking function is used to query and rank recipes obtained from the content source 110, or any other external sources. Based on the ranking scores of the recipes, the recipes are selected as recommended recipes for display to the user.

FIG. 7 is a flowchart illustrating a method for combining the recommended recipes resulting from the methods illustrated in FIG. 5 and FIG. 6, according to one embodiment. In other examples, additional or alternative steps may be performed or the steps may be performed in other orders.

In step 710, the recommended recipes are selected based on feature distribution. The recommended recipes include results from both the method illustrated in FIG. 5 (item-based recommendation) and the method illustrated in FIG. 6 (content-based recommendation). The results are selected according to the feature distribution indicated by the recipes explicitly liked by the user. For example, if the endorsed recipes by the user include 30% desserts, then the merging module 380 selects 30% dessert recipes from both results.

In step 720, the recommended recipes are filtered based on user preference. The user model can be used to compare with the features in the recommended recipes and excludes the recommended recipes having features not matching user preference indicated by the user model.

In step 730, the two sets of the recommended recipes are merged based on normalized ranking of the recommended recipes. The ranking scores from both methods are normalized and are applied an exponential decay. The merging module 380 merges the two sets of recommended recipes based on the decayed and normalized scores.

Accordingly, the item-based recommendation, the content-based recommendation and a combination of them can be achieved. This hybrid item-based/content-based recommendation for recipes can be significantly beneficial with respect to increasing user engagement with the website hosting the recipes or software applications providing the recipes, as the hybrid item-based/content-based recommendation provides recommended recipes to a user not only based on the user's activity, but also based on the content-based relationships between the recipes. In addition, embodiments in the disclosure also include a mechanism to provide some diversity in the recommended recipes and therefore make the results more attractive to users.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The modules described herein represent an implementation of one embodiment, but various other embodiments may include additional, fewer, or different modules to implement the methods, systems, or non-transitory, computer-readable media delineated in the accompanying claims. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method of recommending recipes, the method comprising:
receiving user activity data describing how a user interacts with recipes posted on a web page;
generating a first set of recommended recipes for the user based on the user activity data;

building a content model based on content of the recipes, the content model aligning recipe features extracted from the content of the recipes;

generating a second set of recommended recipes based on the content model, generating the second set of recommended recipes comprising:

identifying a set of seed objects;

generating an aligned feature set for each of the seed objects using the content model, wherein the aligned feature set includes first features extracted from the seed object, second features of a plurality of recipes aligned from the first features, and alignment probabilities describing alignments from the first features to the second features;

aggregating the aligned feature sets for the seed objects into a ranking function; and searching for the recommended recipes in the second set based on the ranking function, wherein the searching comprises:

selecting a subset of the second features, the selecting comprising excluding second features having one-to-one alignments with respective first features from the ranking function; and ranking recipes from a content source responsive to the selected subset of second features and the alignment probabilities;

merging the first set of recommended recipes and the second set of recommended recipes; and transmitting the merged recommended recipes for display to the user.

2. The method of claim 1, wherein generating the first set of recommended recipes for the user based on the user activity data comprises:

identifying a first level of seed objects based on the user activity data; and determining, based on a user model associated with the user, a certain number of next levels of candidate recipes transiting from the first level of the seed objects, wherein the candidate recipes are associated with candidate features including transition probabilities that describe the transition from the first level of the seed objects.

3. The method of claim 2, wherein the seed objects are recipes endorsed by the user.

4. The method of claim 3, wherein the user model associated with the user predicts a likelihood that if the user has endorsed a first recipe, the user will like a second recipe.

5. The method of claim 2, wherein generating the first set of recommended recipes for the user based on the user activity data further comprises:

ranking the candidate recipes using logistic regression with one or more of the candidate features;

diversifying the ranked candidate recipes by penalizing candidate recipes transiting from the same seed object; and selecting a certain number of top ranked candidate recipes as the first set of recommended recipes.

6. The method of claim 5, wherein the one or more of the candidate features comprises one or more of a transition probability and a decay time.

7. The method of claim 1, wherein merging the first set of recommended recipes and the second set of recommended recipes is based on normalized ranking scores of the first set of recommended recipes and the second set of recommended recipes.

8. The method of claim 1, wherein merging the first set of recommended recipes and the second set of recommended recipes comprises:

selecting the recommended recipes based on a feature distribution; and filtering the recommended recipes based on a user preference of the user.

9. The method of claim 1, wherein building the content model comprises:

accessing a knowledge graph describing relationships between features of the recipes;

extracting features from the recipes using the relationships described by the knowledge graph; and aligning the features extracted from the recipes with other recipe features using the knowledge graph, each two aligned features having an associated probability indicating a similarity of the two aligned features.

10. The method of claim 1, wherein selecting the subset of the second features further comprises:

selecting a proper subset of the second features responsive to the associated alignment probabilities.

11. The method of claim 1, wherein selecting the subset of the second features further comprises:

selecting a proper subset of the second features having a highest alignment probability.

12. The method of claim 1, wherein selecting the subset of the second features further comprises:

selecting a proper subset of the second features responsive to the associated alignment probabilities and a predetermined distribution of alignment probabilities.

13. A non-transitory computer-readable storage medium comprising instructions for recommending recipes, the instructions when executed by a processor causing the processor to:

receive user activity data describing how a user interacts with recipes posted on a web page;

generate a first set of recommended recipes for the user based on the user activity data;

build a content model based on content of the recipes, the content model aligning recipe features extracted from the content of the recipes;

generate a second set of recommended recipes based on the content model, generating the second set of recommended recipes comprising:

identifying a set of seed objects;

generating an aligned feature set for each of the seed objects using the content model, wherein the aligned feature set includes first features extracted from the seed object, second features of a plurality of recipes aligned from the first features, and alignment probabilities describing alignments from the first features to the second features;

aggregating the aligned feature sets for the seed objects into a ranking function; and searching for the recommended recipes in the second set based on the ranking function, wherein the searching comprises:

selecting a subset of the second features, the selecting comprising excluding second features having one-to-one alignments with respective first features from the ranking function; and ranking recipes from a content source responsive to the selected subset of second features and the alignment probabilities;

merge the first set of recommended recipes and the second set of recommended recipes; and transmit the merged recommended recipes for display to the user.

14. The medium of claim 13, wherein generating the first set of recommended recipes for the user based on the user activity data comprises:
   identifying a first level of seed objects based on the user activity data; and
   determining, based on a user model associated with the user, a certain number of next levels of candidate recipes transiting from the first level of the seed objects, wherein the candidate recipes are associated with candidate features including transition probabilities that describe the transition from the first level of the seed objects.

15. The medium of claim 14, wherein the seed objects are recipes endorsed by the user.

16. The medium of claim 15, wherein the user model associated with the user predicts a likelihood that if the user has endorsed a first recipe, the user will like a second recipe.

17. The medium of claim 14, wherein generating the first set of recommended recipes for the user based on the user activity data further comprises:
   ranking the candidate recipes using logistic regression with one or more of the candidate features;
   diversifying the ranked candidate recipes by penalizing candidate recipes transiting from the same seed object; and
   selecting a certain number of top ranked candidate recipes as the first set of recommended recipes.

18. The medium of claim 17, wherein the one or more of the candidate features comprises one or more of a transition probability and a decay time.

19. The medium of claim 13, wherein merging the first set of recommended recipes and the second set of recommended recipes is based on normalized ranking scores of the first set of recommended recipes and the second set of recommended recipes.

20. The medium of claim 13, wherein merging the first set of recommended recipes and the second set of recommended recipes comprises:
   selecting the recommended recipes based on a feature distribution; and
   filtering the recommended recipes based on a user preference of the user.

21. A system for recommending recipes, the system comprising:
   a processor; and
   a non-transitory computer-readable storage medium comprising instructions executable by the processor, the instructions for:
      receiving user activity data describing how a user interacts with recipes posted on a web page;
      generating a first set of recommended recipes for the user based on the user activity data;
      building a content model based on content of the recipes, the content model aligning recipe features extracted from the content of the recipes;
      generating a second set of recommended recipes based on the content model, generating the second set of recommended recipes comprising:
         identifying a set of seed objects;
         generating an aligned feature set for each of the seed objects using the content model, wherein the aligned feature set includes first features extracted from the seed object, second features of a plurality of recipes aligned from the first features, and alignment probabilities describing alignments from the first features to the second features;
         aggregating the aligned feature sets for the seed objects into a ranking function; and
         searching for the recommended recipes in the second set based on the ranking function, wherein the searching comprises:
            selecting a subset of the second features, the selecting comprising excluding second features having one-to-one alignments with respective first features from the ranking function; and
            ranking recipes from a content source responsive to the selected subset of second features and the alignment probabilities;
      merging the first set of recommended recipes and the second set of recommended recipes; and
      transmitting the merged recommended recipes for display to the user.

22. The system of claim 21, wherein generating the first set of recommended recipes for the user based on the user activity data comprises:
   identifying a first level of seed objects based on the user activity data; and
   determining, based on a user model associated with the user, a certain number of next levels of candidate recipes transiting from the first level of the seed objects, wherein the candidate recipes are associated with candidate features including transition probabilities that describe the transition from the first level of the seed objects.

23. The system of claim 22, wherein the seed objects are recipes endorsed by the user.

24. The system of claim 23, wherein the user model associated with the user predicts a likelihood that if the user has endorsed a first recipe, the user will like a second recipe.

25. The system of claim 22, wherein generating the first set of recommended recipes for the user based on the user activity data further comprises:
   ranking the candidate recipes using logistic regression with one or more of the candidate features;
   diversifying the ranked candidate recipes by penalizing candidate recipes transiting from the same seed object; and
   selecting a certain number of top ranked candidate recipes as the first set of recommended recipes.

26. The system of claim 25, wherein the one or more of the candidate features comprises one or more of a transition probability and a decay time.

27. The system of claim 21, wherein merging the first set of recommended recipes and the second set of recommended recipes is based on normalized ranking scores of the first set of recommended recipes and the second set of recommended recipes.

28. The system of claim 21, wherein merging the first set of recommended recipes and the second set of recommended recipes comprises:
   selecting the recommended recipes based on a feature distribution; and
   filtering the recommended recipes based on a user preference of the user.

* * * * *